US012559100B2

(12) United States Patent
Behringer et al.

(10) Patent No.: US 12,559,100 B2
(45) Date of Patent: Feb. 24, 2026

(54) METHOD FOR ADJUSTING THE SPEED OF A VEHICLE

(71) Applicant: Knorr-Bremse Systeme Fuer Nutzfahrzeuge GmbH, Munich (DE)

(72) Inventors: Reinhold Behringer, Nussdorf-Eberdingen (DE); Birgit Schmortte, Munich (DE); Ulrich Guecker, Schwieberdingen (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 140 days.

(21) Appl. No.: 18/041,882

(22) PCT Filed: Aug. 26, 2021

(86) PCT No.: PCT/EP2021/073614
§ 371 (c)(1),
(2) Date: Feb. 16, 2023

(87) PCT Pub. No.: WO2022/058133
PCT Pub. Date: Mar. 24, 2022

(65) Prior Publication Data
US 2023/0311871 A1    Oct. 5, 2023

(30) Foreign Application Priority Data
Sep. 15, 2020    (EP) .................................... 20196131

(51) Int. Cl.
*B60W 30/00*        (2006.01)
*B60W 30/14*        (2006.01)
*B60W 30/18*        (2012.01)

(52) U.S. Cl.
CPC .... *B60W 30/143* (2013.01); *B60W 30/18163* (2013.01); *B60W 2720/103* (2013.01)

(58) Field of Classification Search
CPC ......... B60W 30/143; B60W 30/18163; B60W 2720/103; G08G 1/09623; G08G 1/22
See application file for complete search history.

(56) References Cited

U.S. PATENT DOCUMENTS

2015/0046058 A1    2/2015    Nagata
2018/0050675 A1    2/2018    Stefan et al.
(Continued)

FOREIGN PATENT DOCUMENTS

DE        202012101687 U1    5/2012

OTHER PUBLICATIONS

International Search Report for PCT/EP2021/073614, Issued Dec. 23, 2021.

*Primary Examiner* — Ramya P Burgess
*Assistant Examiner* — Brittany Renee Peko
(74) *Attorney, Agent, or Firm* — Greenberg Traurig, LLP

(57)        ABSTRACT

A method for adjusting the speed of a vehicle (EGO) moving with an initial speed to a target speed, including: determining a control profile comprising at least one control profile part, in which the control profile includes at least one control parameter for the vehicle (EGO) and allowing the vehicle (EGO) to change its speed from the initial speed to the target speed, and adjusting the speed of the vehicle (EGO) according to the control profile. A further method is disclosed for leading a vehicle (EGO) that is moving on a lane into a target position with respect to at least one other vehicle, in which the method is used to adjust the speed of the vehicle (EGO) to reach the target position. Also described are a related device, a system, a vehicle, a computer program product and a storage medium.

20 Claims, 4 Drawing Sheets

(56)　　　　　　References Cited

U.S. PATENT DOCUMENTS

| 2018/0222422 | A1* | 8/2018 | Takae | B60R 21/0134 |
| 2018/0237011 | A1 | 8/2018 | Laurent | |
| 2018/0345972 | A1* | 12/2018 | Turkoglu | B60W 30/18027 |
| 2019/0106108 | A1* | 4/2019 | Wienecke | B60W 30/12 |
| 2019/0383627 | A1* | 12/2019 | Nangeroni | G01C 21/3461 |
| 2021/0261133 | A1* | 8/2021 | Sakayori | B60W 30/18163 |
| 2021/0323574 | A1* | 10/2021 | Yoo | B60W 60/001 |
| 2021/0362713 | A1* | 11/2021 | Fujimaki | B60W 30/143 |
| 2022/0063618 | A1* | 3/2022 | Yasui | B60W 30/143 |
| 2022/0089186 | A1* | 3/2022 | Gotou | B60W 60/0015 |

* cited by examiner

METHOD FOR ADJUSTING THE SPEED OF A VEHICLE

FIELD OF THE INVENTION

The present invention relates to a first method for adjusting the speed of a vehicle. Further, the invention relates to a method for adjusting the position of the vehicle by executing the first method. Finally, the invention relates to a device, a system, a vehicle, a computer programme product and a storage medium.

BACKGROUND INFORMATION

In the following, autonomous vehicles are understood to be those that are configured in particular to execute the methods that are the subject-matters of the invention. In particular an autonomous vehicle is also a vehicle, that is configured only to execute the method according to the invention. Further, autonomous vehicles can be understood to be configured to drive partially or fully autonomous.

Autonomous driving is a huge field for automotive development. Vehicles must interact with other traffic participants such as other autonomous or non-autonomous vehicles and take other constraints such as obstacles, pedestrians, speed limits, etc. into account. One part of this field relates to the adjusting of the speed of an autonomous vehicle. To reach a target speed from an initial speed several speed profiles are possible. Further, if the vehicle tries to reach a target position relative to another traffic participant it has to adjust its speed to reach this target position. For example, this target position is a position within or at the end of a platoon of several vehicles. However, the target position can be a starting position for a lane change as well. Therefore, there is a need for adjusting the speed of a vehicle and in particular for leading a vehicle into a target position.

SUMMARY OF THE INVENTION

Therefore, it is an object of the present invention to show a solution for this problem.

This object may be reached by the subject-matters of the embodiments described herein. Advantageous embodiments are subject-matters of the further descriptions herein.

A method is provided for adjusting the speed of a vehicle that is moving with an initial speed, to a target speed, comprising the steps:

determining a control profile comprising at least one control profile part, wherein the control profile is comprising at least one control parameter for the vehicle and allowing the vehicle to change its speed from the initial speed to the target speed;

adjusting the speed of the vehicle according to the control profile or supplying the control profile to a speed control system of the vehicle in order to adjust the speed of the vehicle.

The vehicle may comprise a speed control system that is configured to receive at least one control parameter, in particular a target value, and to adjust the speed of the vehicle in reaction to the control parameter.

The control parameter of the control profile may comprise a target value for the vehicle, wherein the vehicle is configured to reach the target value. The target value comprises a target acceleration value or a target acceleration profile, and/or a target speed value or a target speed profile, and/or a target force or target torque value or a target force or target torque profile, and/or a target engine load value or a target engine load profile, and/or a target brake demand value or a target brake demand profile. If at least one of these parameters is supplied to the speed control system of the vehicle, the vehicle may react by its speed control system to reach the corresponding target value or profile.

One control profile part may comprise exclusively a control parameter causing an acceleration or a deceleration of the vehicle, wherein, when the control profile consists of two control profile parts, one of the two control profile parts may comprise exclusively control parameter causing an acceleration and the other of the two control profile parts causing a deceleration. For example, if the control profile comprises a target acceleration, one control profile part can exclusively comprise positive or negative target acceleration values. If the control profile is comprising a target speed, the control profile part causing an acceleration of the vehicle can comprise ascending speed values, wherein the control profile part causing a deceleration of the vehicle can comprise descending speed values.

The control profile may comprise a switching point separating two control profile parts of the control profile from each other. The switching point may divide the control profile into two control profile parts. The two control profile parts can comprise the same length, but in general do not need to have the same length.

The control profile may comprise an end point defining the end of the control profile and when the end point is reached the speed of the vehicle may be equal to the target speed.

The switching point and/or the end point may be determined during the determining of the control profile.

The amount of the average acceleration and/or deceleration caused by two different control profile parts may be equal. In particular, each control profile part can cause a constant acceleration and/or deceleration. One of the two control profile parts may cause an acceleration and the other one a deceleration of the vehicle. These two control profile parts can be adjacent within the control profile.

At least one of the control profile parts may cause a linear adjusting of the speed, wherein the control profile may cause exclusively a linear adjusting of the speed. That means that the adjusting of the speed is executed under constant acceleration and/or deceleration. For example, if the control profile is comprising a target acceleration profile, the corresponding control profile part can comprise a constant acceleration value. If the control profile is comprising a target speed profile, the corresponding control profile part can comprise a linear speed profile.

The control profile may be based on time and/or speed of the vehicle and/or distance of the vehicle. If the control profile is based on time, the switching point and/or the end point can be defined as special points of time within the control profile. If the control profile is based on speed, the switching point and/or the end point can be defined by a special speed value. In this case the end point can be a speed with respect to another vehicle, in particular the speed of the other vehicle. If the control profile is based on distance, the switching point and/or the end point can be defined as special points along the driveway of the vehicle. In this case the end point can be a position with respect to another vehicle.

A method for leading a vehicle that is moving on a lane into a target position with respect to at least one other vehicle is provided, may comprise:

determining a current position of the vehicle with respect to the at least one other vehicle;

determining the target position with respect to the at least one other vehicle; if the current position is not equal to the target position:

executing the method as described above to reach the target position.

The end point of the control profile can also be the target position.

The target position and/or the current position may be longitudinal positions with respect to the direction of travel of the vehicle.

This method can be used to adjust the position of the vehicle with respect to at least one other vehicle by adjusting the speed of the vehicle by the execution of the method as described above, wherein the control profile is determined and applied to the vehicle. However, the method for adjusting the speed as described above is only executed if the current position of the vehicle is not equal to the target position.

The control profile may be determined in such way that the speed of the vehicle is equal to the target speed when reaching the target position. Advantageously, if the method is used to close a gap between the vehicle and another vehicle that is the last vehicle of a platoon, the vehicle reaches the target position, which is a position behind the other vehicle, with the same speed as the other vehicle. Therefore, the vehicle can be integrated into the platoon by reaching the target position. In another use case the method is used to lead the vehicle in a position with respect to another vehicle moving on an adjacent line. This position can be a starting position for a lane change, which can be defined by a safety distance with respect to the other vehicle, wherein the vehicle has to reach this safety distance before starting the lane change maneuver. The starting position can be in front or behind the other vehicle. Further, more than just one vehicle can be taken into account to determine the starting position, for example the starting position is determined by a gap between two vehicles moving behind each other on a lane adjacent to the lane where the vehicle is moving.

In general, at least one other vehicle or the at least one other vehicle is moving in front of the vehicle or behind the vehicle or on an adjacent lane.

One of the methods above may comprise a step wherein determining the target speed from a external source is executed. In particular, the external source is a traffic sign and/or a digital source and/or the speed of at least one other vehicle. As a digital source, a speed limit from digital map data can be used. If the speed of the vehicle shall be adjusted to the speed of another vehicle, the target speed can be determined from the speed of the other vehicle. The target speed may be determined by the use of a detection means, in particular a camera, a radar sensor, a GPS-receiver, a radio receiver.

The control profile, in particular at least one control profile part may be determined under consideration of time optimal, wear optimal and/or energy optimal aspects.

According to a special aspect, the invention models the preparation for a lane change, in which the vehicle intends to merge into an adjacent lane which has traffic moving with a certain speed and distance between the vehicles. The following initial parameters are taking into account: the speed of the vehicle, the speed of the vehicles in the adjacent target lane, the distance of vehicles in adjacent lane, and the longitudinal offset distance between the vehicle and the closest vehicle in the adjacent lane. In the preparation phase, the vehicle aims to reach the point at which it can perform a safe lane change into that target lane. For a safe lane change, the following conditions must be fulfilled: its speed must be the same as the vehicles in the target lane, and its longitudinal offset must be in between two vehicles or at least at a safe distance from the preceding and the following vehicle. The total time which this preparation for a lane change takes, is modelled into two control profile parts, each of which has the same constant acceleration, but with opposite sign. This two-split preparation allows that the vehicle can reach the conditions for a safe lane change from any combination of the initial conditions. This simple model allows to formulate a relation between the following variables: vehicle acceleration, the total lane change preparation time and the time instance where the sign of the acceleration swaps (the switching point separating the total control profile into two control profile parts). The total duration of the preparation phase depends on the initial conditions as well as on the selected acceleration. The mathematical relation between these variables and parameters allows judgement if the lane change preparation is completed within a given time, considering limited lane change length and limited vehicle acceleration capabilities. Also, the algorithm allows to select an acceleration which is optimal under certain conditions, e.g. regarding fuel efficiency, shortest possible time, or other criteria. The approach can also indicate which of the vehicle gaps in the moving traffic lane provides the best possible gap in between two vehicles moving on the target lane, where the vehicle can merge, again depending on its capabilities and boundary conditions. If there is no limit on the merging distance, then the preparation of the control profile with several control profile parts can default into a single time period with a constant acceleration, after which the vehicle is in the proper location for performing the lane change.

A device for executing a method as described above is provided, comprising:

control means configured to cause the device the execution of the method as described above;

an interface configured for supplying the control profile to the vehicle; and/or an interface for receiving data from the vehicle, in particular the speed of the vehicle and/or the position of the vehicle with reference to other vehicles.

The interface can supply the control profile directly to the speed control system of the vehicle. The control means may comprise an electronic control unit, like an ECU. Therefore, by providing the device in the vehicle, the vehicle can be configured for executing the method according to the invention.

Further, a system is provided, comprising:

a device as described above; and at least one detection means configured to detect information from the surrounding of the vehicle, wherein the at least one detection means may include a camera, a radar sensor, a GPS-receiver and/or a radio receiver, wherein the system may be configured to determine the target speed and/or the target position from the information from the detection means.

A vehicle, in particular an autonomous vehicle, may include a device as described above or a system as described above. Alternatively, the vehicle is configured to execute the method as described above in another way.

A computer program product may include code means configured to cause a device, in particular a device as described above, to execute the method as described above.

A storage medium may include a computer program product as described above.

In particular, the invention allows to adjust the speed of the vehicle and in addition its position with respect to another vehicle. This can be used for a driver assistance system or a fully autonomously driving vehicle.

In particular, the invention can determine a feasibility for a lane change from initial conditions like the speed of the vehicle, of at least one other vehicle and of their distances with respect to each other.

In particular, the behaviour of other traffic participants can be taken into account.

In particular, the invention can provide the time after which the adjusting of the speed is finished.

In the following, general and specific aspects of the invention are explained in more detail using the attached drawings.

DETAILED DESCRIPTION

Figure 1:
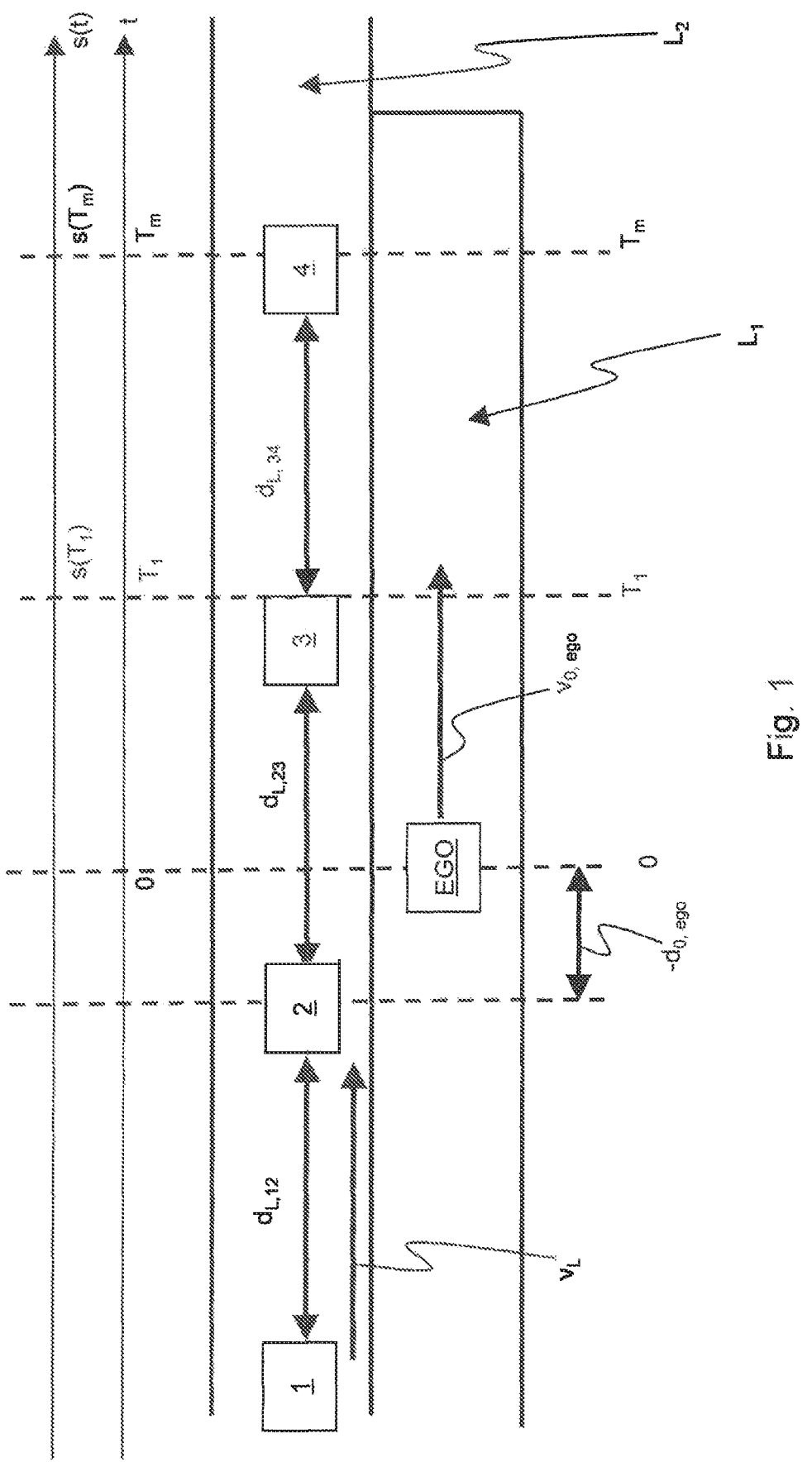
FIG. 1 shows a traffic situation for the executing of the method according to the invention.

FIG. 1 shows a traffic situation seen from above for the executing of the method according to the invention.

Two lanes $L_1$, $L_2$ are shown in the drawing, extending from the left to the right and being parallel and adjacent to each other. In the drawing traffic is moving on both lanes $L_1$, $L_2$ from the left to the right. A vehicle EGO moves on the lane $L_1$ with a speed $v_{ego, 0}$ from the left to the right. The vehicle EGO is configured to adjust its speed by a speed control system according to a control parameter that can be supplied to the speed control system of the vehicle EGO. On lane $L_2$, four vehicles 1, 2, 3, 4 are moving with a speed $v_L$. Between the vehicles 1, 2, 3, 4 there are gaps $d_{L, 12}$, $d_{L, 23}$, $d_{L, 34}$. In the situation shown in the drawing the vehicle EGO has a current or initial position $d_{0, ego}$ with reference to vehicle 2. The vehicles 1, 2, 3, 4 can for example form a platoon.

The lane $L_1$ where the vehicle EGO is moving, is limited in its extension to the right. For example, lane $L_1$ is a merging lane. Therefore, the vehicle EGO needs to change to lane $L_2$ by a lane change maneuver. However, before the vehicle EGO can execute the lane change maneuver, it has to adjust its position and its speed with reference to the vehicles 1, 2, 3, 4 moving already on lane $L_2$, to reach an initial state the vehicle EGO must have for the lane change maneuver.

Above the lanes $L_1$, $L_2$, a time axis t and an axis indicating the distance s(t) are shown, wherein the axis indicating the distance s(t) corresponds to the distance the vehicle EGO moves from left to right.

In this situation, it is an object to get the vehicle EGO into a position on lane $L_1$ with respect to at least one of the vehicles 1, 2, 3, 4 that the vehicle EGO can start a lane change maneuver in order to change from lane $L_1$ to $L_2$. Further, the speed of the vehicle EGO has to be adjusted in such way that a lane change maneuver can be started. Therefore, the speed of the vehicle EGO must not be too slow or too fast. For example, the speed of the vehicle EGO should be equal to the speed $v_L$ of the vehicles 1, 2, 3, 4 or at least within the same scale. Further, the ending of the lane $L_1$ has to be considered by the method.

According to the invention, a control profile is determined comprising at least one control parameter allowing adjusting the speed of the vehicle EGO to a target speed. The target speed can be determined as stated above, from the speed $v_L$ of the vehicles 1, 2, 3, 4. The control parameter can comprise a target profile or value, that is supplied to the speed control system of the vehicle EGO. For example, the control parameter comprises a target value as described above.

In the drawing, a switching point $T_1$ is shown, which is determined as a part of the control profile. In this embodiment of the invention the switching point is a point of time, whereby two control profile parts are separated.

Further, an end point $T_m$ is shown, which is determined as a part of the control profile. In this embodiment of the invention the end point is a point of time, whereby the ending of the control profile and its duration is defined.

During the time period from 0 to $T_1$, adjusting the speed of the vehicle EGO is executed according to a first control profile part and during the time period from $T_1$ to $T_m$, adjusting the speed of the vehicle EGO is executed according to a second control profile part. For example, both control profile parts can be configured to cause exclusively acceleration of the vehicle EGO during the executing one of both control profile parts, wherein during executing of the other control profile part exclusively deceleration of the vehicle EGO is caused.

By the determination of the end point $T_m$ the time is set for adjusting the distance $d_{0, ego}$ to the distance needed to join the platoon and for adjusting the speed of the vehicle EGO to a corresponding speed.

Figure 2:
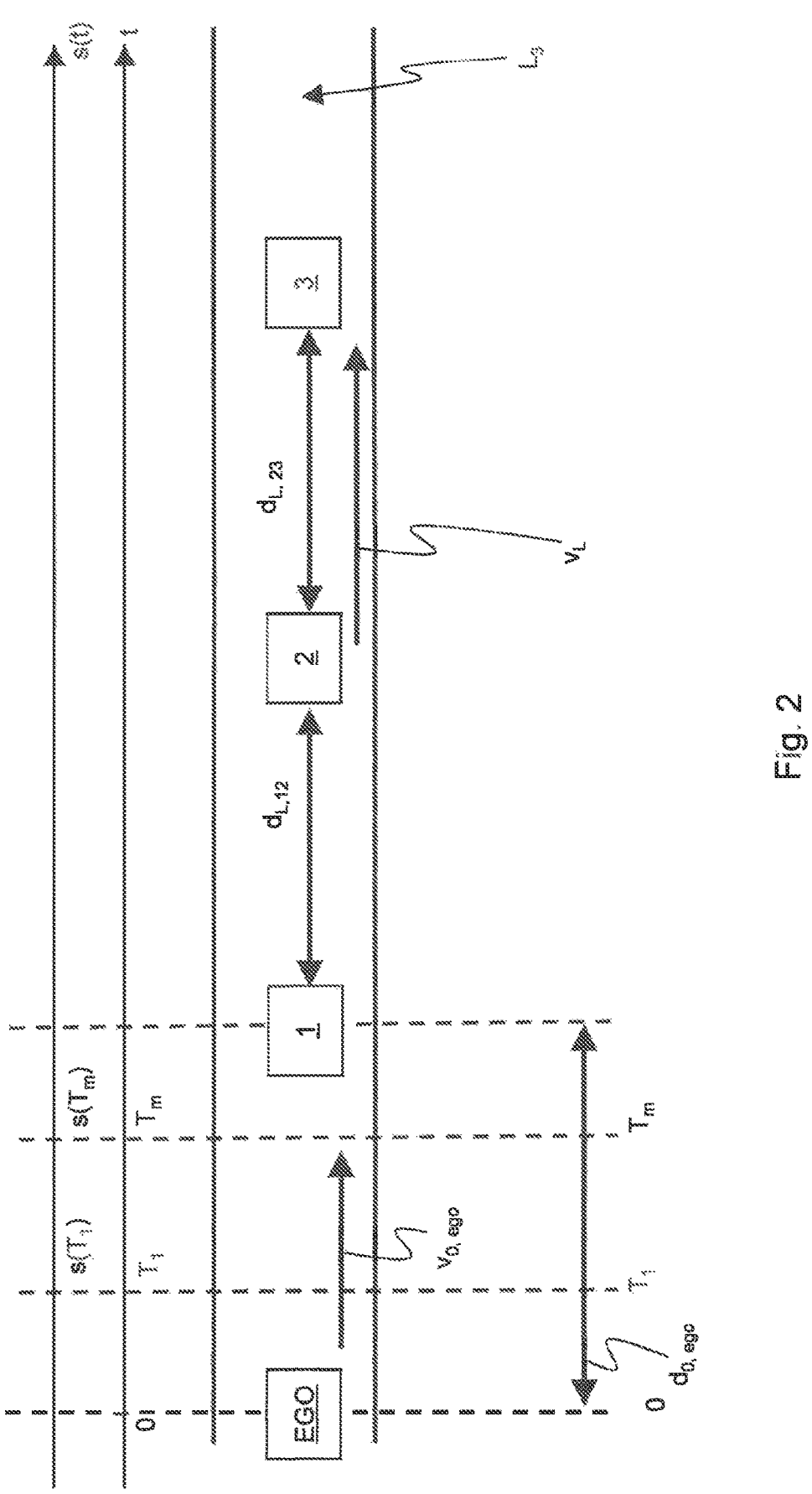
FIG. 2 shows another traffic situation for the executing of the method according to the invention.

FIG. 2 shows another traffic situation seen from above for the executing of the method according to the invention.

A vehicle EGO is shown which corresponds to the vehicle EGO of FIG. 1. The vehicle EGO is moving with its speed $v_{ego, 0}$ from the left to the right on a lane $L_3$ which is extending from the left to the right.

The vehicle EGO is approaching to several vehicles 1, 2, 3, 4 moving in front of the vehicle EGO, wherein the vehicles 1, 2, 3, 4 are moving with a speed $v_L$ on the same lane $L_3$. The vehicles 1, 2, 3, 4 can, for example, act as a platoon as shown in FIG. 1. In the situation shown on the drawing, the vehicle EGO is in an initial position $d_{0, ego}$ with reference to the vehicle 1.

Above the lane $L_3$, a time axis t and an axis indicating the distance s(t) are shown, wherein the axis indicating the distance s(t) corresponds to the distance the vehicle EGO moves from left to right.

In this situation, it can be an object to get the vehicle EGO into a position on lane $L_3$ with respect to at least one of the vehicles 1, 2, 3, 4, in particular to vehicle 1, wherein the vehicle EGO can join the platoon of the vehicles 1, 2, 3, 4. Further, the speed of the vehicle EGO has to be adjusted in such way, that no safety critical situation appears on the one hand and that on the other hand the vehicle EGO can reduce the distance to the vehicle 1 indeed. Therefore, the speed of the vehicle EGO in the target position behind vehicle 1 must not be too slow or too fast. For example, the speed of the vehicle EGO should be equal to the speed $v_L$ of the vehicles 1, 2, 3, 4 or at least within the same scale.

According to the invention, a control profile is determined comprising at least one control parameter allowing adjusting the speed of the vehicle EGO to a target speed. The target speed can be determined as stated above, from the speed $v_L$ of the vehicles 1, 2, 3, 4. The control parameter can comprise a target profile or value, that is supplied to the speed control system of the vehicle EGO. For example, the control parameter comprises a target value as described above.

In the drawing, a switching point $T_1$ is shown, which is determined as a part of the control profile. In this embodiment of the invention the switching point $T_1$ is a point of time, whereby two control profile parts are separated.

Further, an end point $T_m$ is shown, which is determined as a part of the control profile. In this embodiment of the invention the end point $T_m$ is a point of time, whereby the ending of the control profile and its duration is defined.

During the time period from 0 to $T_1$, adjusting the speed of the vehicle EGO is executed according to a first control profile part and during the time period from $T_1$ to $T_m$, adjusting the speed of the vehicle EGO is executed according to a second control profile part. For example, both control profile parts can be configured to cause exclusively acceleration of the vehicle EGO during the executing one of both control profile parts, wherein during executing of the other control profile part exclusively deceleration of the vehicle EGO is caused.

By the determination of the end point $T_m$ the time is set for adjusting the distance $d_{0,\ ego}$ to the distance needed to join the platoon and for adjusting the speed of the vehicle EGO to a corresponding speed.

Figure 3:
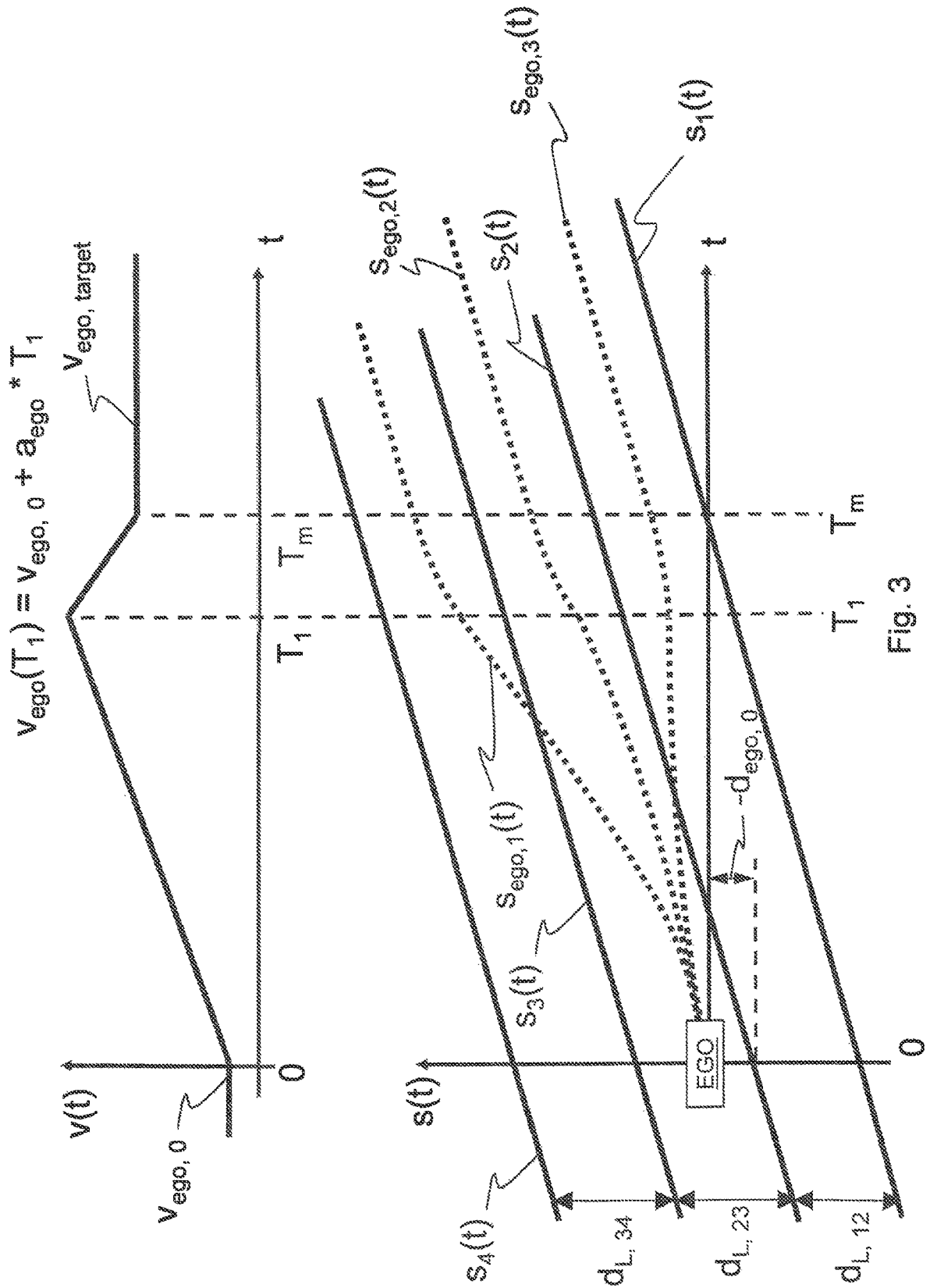
FIG. 3 shows the execution of the method according to the invention using speed and distance profiles.

FIG. 3 shows the execution of the method according to the invention using speed and distance profiles.

In the drawing shown above, a time based control parameter as part of a control profile is shown comprising a target speed profile of the vehicle EGO as shown in FIG. 1 or FIG. 2. If this control profile, in particular this control parameter, is supplied to the speed control system of the vehicle EGO as a target value, the vehicle EGO will adjust its speed according to the control profile, which causes acceleration or deceleration of the vehicle EGO.

The target speed profile begins with an initial speed $v_{ego,0}$ the vehicle is moving at time 0. The target speed profile is comprising an end point $T_m$ wherein the target speed $v_{ego,\ target}$ is reached. Between time 0 and the end point $T_m$, a switching point $T_1$ is shown. The switching point $T_1$ divides the target speed profile into to control profile parts. The first control profile part extends from time 0 to the switching point $T_1$ wherein the second profile part extends from the switching point $T_1$ to the end point $T_m$.

The first control profile part causes the vehicle EGO exclusively to increase its speed wherein at the switching point T1 the speed can be calculated as $$v_{ego}(T_1)=v_{ego,0}+a_{ego}{\times}T_1,$$

wherein $a_{ego}$ is the average acceleration from time 0 to the switching point $T_1$. It has to be noted, that the value of $v_{ego}(T_1)$ is bigger than the target speed $v_{ego,\ target}$. This is the general case when the control profile consists of two parts and when the control profile starts with a control profile part causing the acceleration of the vehicle EGO.

The second control profile part causes the vehicle EGO exclusively to decrease its speed to reach $v_{ego,\ target}$ at the end point $T_m$.

In the case shown in the drawing, the amount of the average acceleration from time 0 to $T_1$ and the amount of the average acceleration from time $T_1$ to $T_m$ are equal. In general, they can differ from each other. Further, the speed profile shown in the drawing comprises two control profile parts with a linear character. In general, profiles that are more complex are possible as well.

In the lower part of FIG. 3 time based plots of the distance s(t) the vehicle EGO and other vehicles 1, 2, 3, 4 are shown.

For simplification, it is assumed, that the vehicles 1, 2, 3, 4 are moving with the same constant speed. Therefore, the plots of their distances $s_1(t)$, $s_2(t)$, $s_3(t)$, $s_4(t)$ are linear and oriented in parallel to each other. Further, the distances $d_{L,\ 12}$, $d_{L,\ 23}$, $d_{L,\ 34}$ between the vehicles 1, 2, 3, 4 are constant.

Further, in the drawing three trajectories $s_{ego,\ 1}(t)$, $s_{ego,\ 2}(t)$, $s_{ego,\ 3}(t)$ are shown by dotted lines representing three possible ways the vehicle EGO can take to adjust its speed and its position with reference to the vehicles 1, 2, 3, 4. At the time 0 the vehicle EGO is moving between the vehicles 2 and 3, wherein there is an initial distance $d_{ego,\ 0}$ between the vehicle EGO and the vehicle 2.

In this situation, for example it is the object bringing the vehicle EGO into a position allowing the start of a lane change into a gap between two of the vehicles 1, 2, 3, 4. This situation is similar to the situation shown in FIG. 1.

If the vehicle EGO shall move into the gap between vehicle 3 and 4, it has to adjust its position with reference to the other vehicles 1, 2, 3, 4 according to $s_{ego,\ 1}(t)$ corresponding to the control profile shown in the drawing above. Therefore, the vehicle EGO has to accelerate to overtake vehicle 3 and to establish a safety distance to this vehicle 3. The acceleration stops by reaching the switching point $T_1$ wherein the vehicle EGO starts to reduce its speed to reach the target position between the vehicles 3 and 4 with the target speed $v_{ego,\ target}$. The time points $T_1$ and $T_m$ and the amount of the acceleration and deceleration are determined by the determining of the profile shown above.

If the vehicle EGO shall change into another gap for example between the vehicles 1 and 2 or 2 and 3, another control profile is determined by the method according to the invention, causing the vehicle EGO to follow the trajectories according to the distances $s_{ego,\ 2}(t)$ or $s_{ego,\ 3}(t)$. The control profiles causing these trajectories differ from the control profile causing the trajectory according to $s_{ego,\ 1}(t)$.

Figure 4:
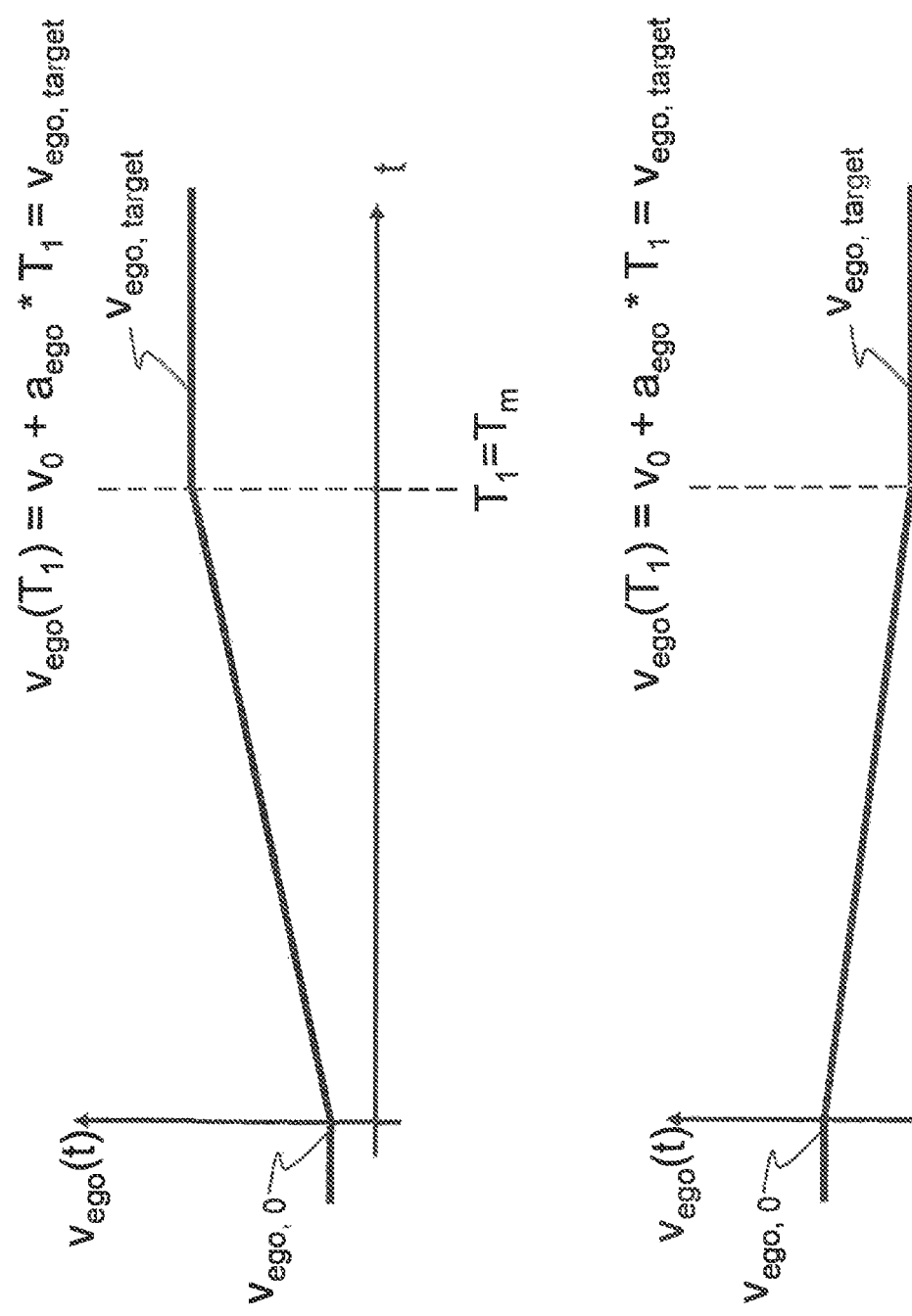
FIG. 4 shows special use cases of the invention.

FIG. 4 shows special use cases of the invention. In these cases the control profile comprises only one control profile part. Such control profiles are for example determined when the switching point $T_1$ is set equal to the end point $T_m$.

The upper drawing shows the case when the initial speed $v_{ego,\ 0}$ shall be adjusted to a target speed $v_{ego,\ target}$, wherein the initial speed $v_{ego,\ 0}$ is smaller than the target speed $v_{ego,\ target}$. The lower drawing shows the other case, wherein the initial speed $v_{ego,\ 0}$ is higher than the target speed $v_{ego,\ target}$. In both cases only one control profile part can be identified wherein the corresponding control parameter only increases or decreases with an average acceleration or deceleration $a_{ego}$. In the case shown in the drawing, the acceleration or deceleration $a_{ego}$ is constant during the only control profile part. In these special cases the speed at the switching point $T_1$ or end point $T_m$ can be calculated as follows:

$$v_{ego}(T_1)=v_{ego,0}+a_{ego}{\times}T_1=v_{ego,target}$$

Embodiment of the Invention

In the following, a particular embodiment of the invention is described based on mathematical formulas. This is a general and simplified use case of the invention for determination of a time based control profile comprising two control profile parts, wherein no constraint are considered. The embodiment shows the determination of a control profile, in particular the determination of the switching point $T_1$ and the end point $T_m$ for the situation shown in FIG. 1. For simplification, it is assumed that the vehicles 1, 2, 3, 4 are all moving with the same speed $v_L$. Further, the distances $d_{L,\,12}$, $d_{L,\,23}$, $d_{L,\,34}$ are all identical and therefore written as $d_L$ in the following. In addition it is assumed, that the amount of the acceleration and deceleration $a_{ego}$ the vehicle EGO uses for adjusting its speed $v_{ego}$ is equal.

Therefore, the distance $s_L(t)$ driven by one of the vehicles 1, 2, 3, 4 can be written as follows:

$$s_L(t) = -d_{ego,0} + v_L \times t$$

The speed $v_{ego}(T_m)$ of the vehicle EGO at the end point $T_m$ can be calculated as follows:

$$v_{ego}(T_m) = v_{ego,0} + a_{ego} \times T_1 - a_{ego} \times (T_m - T_1) \tag{1}$$

Further, the distance $s_{ego}(T_m)$ driven by the vehicle EGO at the end point $T_m$ can be calculated as follows:

$$s_{ego}(T_m) = \tag{2}$$
$$v_{ego,0} \times T_m + \frac{1}{2} a_{ego} \times T_1^2 - a_{ego} \times T_1 \times (T_m - T_1) - \frac{1}{2} \times a_{ego}(T_m - T_1)^2$$

For the preparation of a lane change, the vehicle EGO shall have the same speed as the vehicles 1, 2, 3, 4 moving on the adjacent lane $L_2$. Therefore, at the end point $T_m$, $v_{ego}(T_m)$ shall be equal to $v_L$ $$v_{ego}(T_m) = v_L \tag{3}$$

and the distance of the vehicle EGO at the end point $T_m$ shall be:

$$s_{ego}(T_m) = v_L \times T_m + \frac{d_L}{2} - d_{ego,0} + N \times d_L \tag{4}$$

Wherein N indicates the number of gaps the vehicle EGO has to pass to reach the gap it will enter.

Since the amount of the acceleration and deceleration $a_{ego}$ of the vehicle EGO is assumed to be equal, at the switching point $T_1$, the following equation can be formulated:

$$a_{ego} = \frac{v_{ego}(T_1) - v_{ego,0}}{T_1} = \frac{v_{ego}(T_1) - v_{ego,0}}{T_m - T_1} \tag{5}$$

With $v_{ego}(T_1) = v_{ego,0} + a_{ego} \times T_1$

From the equations above, the following expressions for $T_1$ can be formed:

$$T_1 = \frac{T_m}{2} + \frac{1}{2} \frac{v_L - v_{ego,0}}{a_{ego}} \tag{6}$$

$$T_1 = T_m - \sqrt{\frac{T_m^2}{2} - T_m \frac{v_L - v_{ego,0}}{a_{ego}} + \frac{\frac{d_L}{2} - d_{ego,0}}{a_{ego}}} \tag{7}$$

With the following expressions $$T_v(a_{ego}) = \frac{v_L - v_{ego,0}}{a_{ego}} \tag{8}$$

10 describing the time which it takes to reach $v_L$ from $v_{ego,\,o}$ when using the acceleration $a_{ego}$, and $$T_d^2(a_{ego}) = 2 \frac{\frac{d_L}{2} - d_{ego,0} + N \times d_L}{a_{ego}} \tag{9}$$

describing the time which it takes to change the distance offset from $d_0$ to $d_L/2$ with the acceleration $a_{ego}$, the following expressions for $T_m$ and $T_1$ can be formed:

$$T_m(a_{ego}) = T_v(a_{ego})\left(1 \pm \sqrt{2}\sqrt{1 - \left(\frac{T_d(a_{ego})}{T_v(a_{ego})}\right)^2}\right) \tag{10}$$

$$T_1(a_{ego}) = T_v(a_{ego})\left(1 \pm \frac{1}{\sqrt{2}}\sqrt{1 - \left(\frac{T_d(a_{ego})}{T_v(a_{ego})}\right)^2}\right) \tag{11}$$

This is the general relation between the control parameters $T_1$, $T_m$ and $a_{ego}$ based on the initial parameters $v_{ego,\,0}$, $v_L$, $d_{ego,\,0}$, $d_L$. That means, that only from these initial parameters, a control profile can be determined.

THE LIST OF REFERENCE SIGNS IS AS FOLLOWS

1 vehicle
2 vehicle
3 vehicle
4 vehicle
$a_{ego}$ acceleration/deceleration of the vehicle EGO
$d_L$ distance between vehicles
$d_{L,\,i}$ distance between vehicles
EGO vehicle
$L_i$ lane
$s_i$ distance
S10 method step
S12 method step
S13 method step
S14 method step
S16 method step
$T_1$ switching point
$T_m$ end point
$v_{ego}$ speed of the vehicle EGO
$v_{ego,\,0}$ initial speed of the vehicle EGO
$v_{ego,\,target}$ target speed of the vehicle EGO
$v_L$ speed of the vehicles 1, 2, 3, 4

The invention claimed is:
1. A method comprising:
adjusting a speed of an EGO vehicle that is moving with an initial speed to a target speed, wherein the adjusting the speed comprises:
determining, by a control means, a control profile,
wherein the control profile is based on time and a distance the EGO vehicle moves, and
wherein the control profile includes:
at least one control profile part,
at least one control parameter for the EGO vehicle for adjusting the speed of the EGO vehicle to the target speed; and
adjusting, by the control means, the speed of the EGO vehicle according to the control profile.
2. The method of claim 1, wherein one control profile part includes an exclusive control parameter causing an acceleration or a deceleration.

3. The method of claim 1, wherein the control profile includes a switching point separating two control profile parts of the control profile from each other, and/or wherein the control profile includes an end point defining the end of the control profile when reached the speed of the EGO vehicle is equal to the target speed.

4. The method of claim 1, wherein an amount of the average acceleration and/or deceleration caused by two different control profile parts is equal.

5. The method of claim 1, wherein at least one of the control profile parts causes a linear adjusting of the speed.

6. The method of claim 1, wherein the control profile is further based on speed of the EGO vehicle.

7. The method of claim 1, wherein the control parameter includes a target value, and/or a target speed value or a target speed profile, and/or a target force or target torque value or a target force or target torque profile, and/or a target engine load value or a target engine load profile, and/or a target brake demand value or a target brake demand profile.

8. A method comprising:
leading an EGO vehicle that is moving on a lane into a target position with respect to at least one other vehicle, wherein the leading comprises:
determining, by a control means, a current position of the EGO vehicle with respect to the at least one other vehicle;
determining, by the control means, a target position with respect to the at least one other vehicle; and
executing, by the control means, a process, to reach the target position, when the current position is not equal to the target position, for adjusting a speed of the EGO vehicle moving with an initial speed to a target speed, by performing the following:
determining, by the control means, a control profile,
wherein the control profile is based on time and a distance the EGO vehicle moves, and
wherein the control profile includes:
at least one control profile part,
at least one control parameter for the EGO vehicle for adjusting the speed of the EGO vehicle to the target speed; and
adjusting, by the control means, the speed of the EGO vehicle according to the control profile.

9. The method of claim 8, wherein the control profile is determined so that the speed of the EGO vehicle includes the target speed when reaching the target position, and/or wherein the at least one other vehicle is moving in front of the EGO vehicle or behind the EGO vehicle or on an adjacent lane.

10. The method of claim 8, further comprising:
determining the target speed from an external source, which is from a traffic sign and/or from a digital source and/or from the speed of at least one other vehicle.

11. A device for adjusting a speed of an EGO vehicle, comprising:
a control means for adjusting the speed of the EGO vehicle that is moving with an initial speed to a target speed, wherein the control means is configured to perform the following:
determine a control profile,
wherein the control profile is based on time and a distance the EGO vehicle moves, and
wherein the control profile includes:
at least one control profile part,
at least one control parameter for the EGO vehicle for adjusting the speed of the EGO vehicle to the target speed; and adjust the speed of the EGO vehicle according to the control profile; and
an interface to supply the control profile to the EGO vehicle, and/or to receive data from the EGO vehicle.

12. A system comprising:
a device for adjusting a speed of an EGO vehicle,
wherein the device includes:
a control means for adjusting the speed of the EGO vehicle that is moving with an initial speed to a target speed, wherein the control means is configured to perform the following:
determine a control profile,
wherein the control profile is based on time and a distance the EGO vehicle moves, and
wherein the control profile includes:
at least one control profile part,
at least one control parameter for the EGO vehicle for adjusting the speed of the EGO vehicle to the target speed; and
adjusting the speed of the EGO vehicle according to the control profile;
an interface to supply the control profile to the EGO vehicle, and/or to receive data from the EGO vehicle; and
at least one detection means for detecting information from the surrounding of the EGO vehicle.

13. The system of claim 12, wherein the at least one detection means includes at least one of a camera, a radar sensor, a GPS-receiver and/or a radio receiver, and wherein the system is configured to determine the target speed and/or a target position from the information of the detection means.

14. An EGO vehicle, comprising:
a control means for adjusting a speed of the EGO vehicle moving with an initial speed to a target speed, wherein the control means is configured to perform the following:
determine a control profile,
wherein the control profile is based on time and a distance the EGO vehicle moves, and
wherein the control profile includes:
at least one control profile part,
at least one control parameter for the EGO vehicle for adjusting the speed of the EGO vehicle to the target speed; and
adjust the speed of the EGO vehicle according to the control profile; and
an interface to supply the control profile to the EGO vehicle, and/or to receive data from the EGO vehicle.

15. The method of claim 1, wherein one control profile part includes an exclusive control parameter causing an acceleration or a deceleration, and wherein, when the control profile consists of two control profile parts, one of the two control profile parts includes an exclusive control parameter causing an acceleration and the other of the two control profile parts causing a deceleration.

16. The method of claim 1, wherein the control profile includes a switching point separating two control profile parts of the control profile from each other, the switching point dividing the control profile into two control profile parts, and/or wherein the control profile includes an end point defining the end of the control profile when reached the speed of the EGO vehicle is equal to the target speed.

17. The method of claim 1, wherein at least one of the control profile parts causes a linear adjusting of the speed, and wherein the control profile causes exclusively a linear adjusting of the speed.

18. The method of claim 1, wherein the control parameter includes a target value, which is a target acceleration value or a target acceleration profile, and/or a target speed value or a target speed profile, and/or a target force or target torque value or a target force or target torque profile, and/or a target engine load value or a target engine load profile, and/or a target brake demand value or a target brake demand profile.

19. The method of claim 1, wherein the control means determining the control profile which is based on time comprises:

determining an end point time $(T_m)$, wherein the control means adjusting the speed of the EGO vehicle according to the control profile is performed by the end point time $(T_m)$.

20. A non-transitory computer readable medium having a computer program, which is executable by a processor, comprising:

a program code, which when executed by the processor, performs the method according to claim 1.

* * * * *